United States Patent
Bulmer et al.

(10) Patent No.: US 10,296,216 B2
(45) Date of Patent: May 21, 2019

(54) PRIORITIZING DEDICATED HOST PORTS WHEN N-PORT ID VIRTUALIZATION IS ENABLED IN A STORAGE CONTROLLER

(71) Applicant: International Business Machines Corporation, Armonk, NY (US)

(72) Inventors: Christopher W. Bulmer, Hursley (GB); Timothy A. Moran, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/597,428

(22) Filed: May 17, 2017

(65) Prior Publication Data

US 2018/0335945 A1 Nov. 22, 2018

(51) Int. Cl.
*G06F 13/20* (2006.01)
*G06F 3/06* (2006.01)
(Continued)

(52) U.S. Cl.
CPC ............ *G06F 3/0604* (2013.01); *G06F 3/067* (2013.01); *G06F 3/0659* (2013.01);
(Continued)

(58) Field of Classification Search
CPC .............. G06F 13/1605; G06F 13/426; G06F 2213/0008; G06F 2213/0036;
(Continued)

(56) References Cited

U.S. PATENT DOCUMENTS 8,028,062 B1 9/2011 Wigmore et al.
8,060,775 B1 11/2011 Sharma et al.
(Continued)

OTHER PUBLICATIONS

Powell, Therron et al., "NPIV SAN Integration And Microsoft Virtualization", Microsoft Corporation, WinHEC 2007, http://download.microsoft.com/download/a/f/d/afdfd50d-6eb9-425e-84e1-b4085a80e34e/svr-t320_wh07.pptx, (month unknown) 2007, 50 pages.

(Continued)

*Primary Examiner* — Idriss N Alrobaye
*Assistant Examiner* — Richard B Franklin
(74) *Attorney, Agent, or Firm* — Francis Lammes; Stephen J. Walder, Jr.; Robert M. Sullivan

(57) ABSTRACT

Executing connections from a data processing system to a storage controller using ports specified in a TPG report. The storage controller receives a RTPG SCSI request from the data processing system via a FC fabric. The storage controller determines whether NPIV is enabled on the storage controller and, if so, the storage controller modifies the TPG report to include one or more dedicated N-Ports and one or more multi-purpose N-Ports, where AAS bits of a dedicated N-Port descriptor associated with the dedicated N-Ports are set as Active/optimized. The storage controller sends the modified TPG report to the data processing system. The storage controller then processes an access request received from the data processing system where the access request is received on one of the one or more dedicated N-Ports and the one or more multi-purpose N-Ports according to the TPG report and a device type of the data processing system.

20 Claims, 4 Drawing Sheets

(51) Int. Cl.
*G06F 13/42* (2006.01)
*G06F 13/16* (2006.01)

(52) U.S. Cl.
CPC .......... *G06F 3/0665* (2013.01); *G06F 3/0689* (2013.01); *G06F 13/1605* (2013.01); *G06F 13/426* (2013.01); *G06F 2213/0008* (2013.01); *G06F 2213/0036* (2013.01)

(58) Field of Classification Search
CPC .... G06F 3/0604; G06F 3/0659; G06F 3/0665; G06F 3/067; G06F 3/0689
See application file for complete search history.

(56) References Cited

U.S. PATENT DOCUMENTS

| | | | |
|---|---|---|---|
| 8,495,325 B2* | 7/2013 | Yamamoto | G06F 3/0617 711/154 |
| 8,626,967 B1 | 1/2014 | Naik et al. | |
| 8,949,656 B1 | 2/2015 | Ninan et al. | |
| 9,098,200 B2* | 8/2015 | Nakajima | G06F 3/0605 |
| 9,348,530 B2 | 5/2016 | Madnani et al. | |
| 9,411,628 B2 | 8/2016 | Bezbaruah et al. | |
| 2006/0006810 A1 | 1/2006 | Verdun | |
| 2012/0124312 A1 | 5/2012 | Vemuri et al. | |
| 2015/0277803 A1 | 10/2015 | Nakajima | |
| 2016/0077738 A1 | 3/2016 | Chiu et al. | |

OTHER PUBLICATIONS

List of IBM Patents or Patent Applications Treated as Related, Jan. 30, 2018, 2 pages.

"Deleting a node from a clustered system using the CLI: SAN Volume Controller 6.4", IBM Corporation, IBM Knowledge Center, https://www.ibm.com/support/knowledgecenter/en/STPVGU/com.ibm.storage.svc.console.640.doc/svc_deletenodefrmclustercli_2l3n2l.html, Retrieved from the internet May 22, 2017, 3 pages.

* cited by examiner

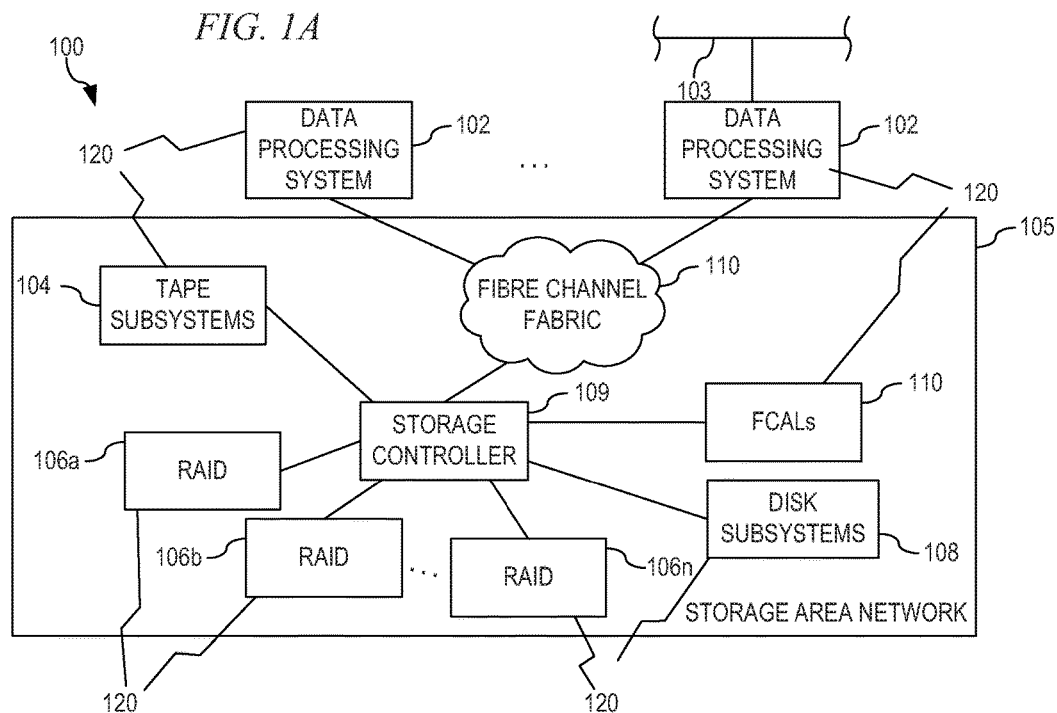
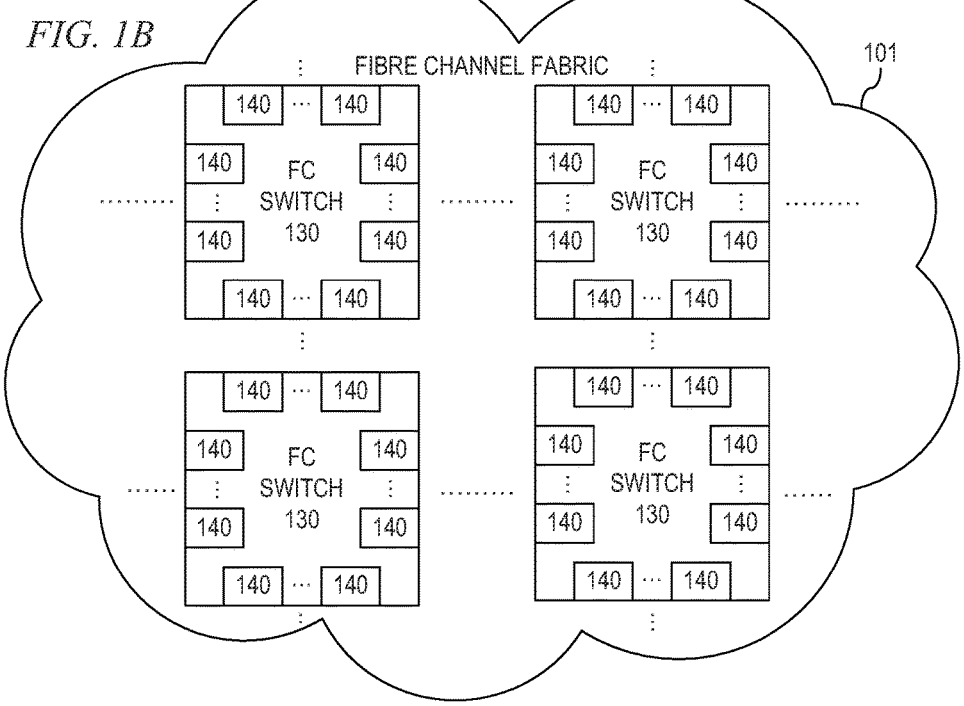

__PRIORITIZING DEDICATED HOST PORTS WHEN N-PORT ID VIRTUALIZATION IS ENABLED IN A STORAGE CONTROLLER__

BACKGROUND

The present application relates generally to an improved data processing apparatus and method and more specifically to mechanisms for prioritizing the use of dedicated host ports when N-Port ID Virtualization (NPIV) is enabled in a storage controller.

N-Port ID Virtualization (NM) is an American National Standards Institute (ANSI) T11 standard that describes how multiple Fibre Channel (FC) node port (N-Port) IDs may share a single physical N-Port using several virtual worldwide port names (WWPNs). Sharing a single physical N-Port using several virtual WWPNs eases hardware requirements in Storage Area Network (SAN) design, especially where virtual SANs are utilized. When physical N-Ports are owned by a storage controller, each physical N-Port may be used for multiple purposes, such as a target for host input/output (I/O), an initiator of I/O to back-end storage devices, to handle communication between nodes in the storage controller, or the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for executing a connection from a data processing system to the storage controller using ports specified in a target port group (TPG) report. The illustrative embodiment receives, by the storage controller, a report target port groups (RTPG) Small Computer System Interface (SCSI) request from the data processing system via a Fibre Channel (PC) fabric. The illustrative embodiment determines, by the storage controller, whether N-Port ID Virtualization (NPIV) is enabled on the storage controller. Responsive to NPIV being enabled, the illustrative embodiment modifies, by the storage controller, the TPG report to be sent to the data processing system to include one or more dedicated N-Ports and one or more multi-purpose N-Ports. In the illustrative embodiment, modifying the TPG report for the one or more dedicated N-Ports includes setting Asymmetric Access State (AAS) bits associated with the dedicated N-Ports as Active/optimized. The illustrative embodiment sends, by the storage controller, the modified TPG report to the data processing system. The illustrative embodiment processes, by the storage controller, an access request received from the data processing system to one or more data processing devices controlled by the storage controller, wherein the access request is received on one of the one or more dedicated N-Ports and the one or more multi-purpose N-Ports according to the TPG report and a device type of the data processing system.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 1A and 1B depict one embodiment of a data processing network suitable for implementing the illustrative embodiments;

DETAILED DESCRIPTION

Figure 2:
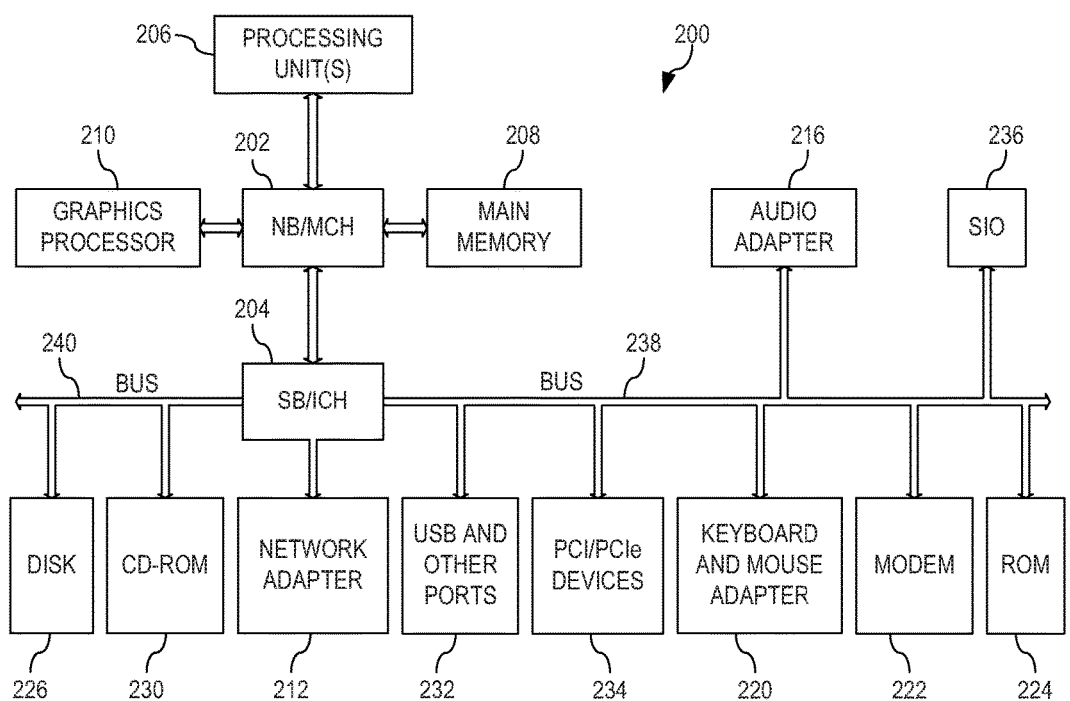
FIG. 2 is an example block diagram of a computing device in which aspects of the illustrative embodiments may be implemented.

The illustrative embodiments provide mechanisms for prioritizing the use of dedicated host ports when N-Port ID Virtualization (NPIV) is enabled in a storage controller. As noted above, NPIV provides for multiple Fibre Channel (FC) node port (N-Port) IDs to share a single physical N-Port using several virtual worldwide port names (WWPNs). When physical N-Ports are owned by a storage controller, each physical N-Port may be used for multiple purposes, such as a target for host input/output (I/O), an initiator of I/O to back-end storage devices, to handle communication between nodes in the storage controller, or the like. In a well-configured SAN system, a network/storage administrator may use FC switch zoning so that hosts may only use the dedicated host ports (i.e. prevent hosts from seeing multi-purpose ports). FC switch zoning is the partitioning of a FC fabric into smaller subsets to restrict interference, add security, and to simplify management. While a SAN system makes several devices and/or ports available to a single device, each device connected to the SAN system should only be allowed access to a controlled subset of these devices/ports. However, utilization of FC switch zoning/rezoning may be inconvenient, especially in complex configurations where there is a risk that FC switch zoning/rezoning may result in a loss of host access to the storage controller.

In order to overcome the deficiencies of current FC switch zoning/rezoning implementations, the illustrative embodiments provide mechanisms for host access prioritized utilization of dedicated N-Ports and/or multi-purpose N-Ports when N-Port ID Virtualization (NPIV) is enabled in a storage controller. Utilizing Asymmetric Access State (AAS) bits in a target port group (TPG) report, well-configured hosts that conform to Asymmetrical Logical Unit Access (ALUA) standards will utilize dedicated N-Ports even when the FC fabric is zoned such that hosts may access the storage controller through both types of port (dedicated N-Ports and multi-purpose N-Ports). When virtual N-Ports are enabled, additional target port group descriptors are added to TPG reports to report an additional port group per node. Each TPG report indicates a group for traditional N-Ports, i.e. multi-purpose N-Ports, and an additional group for dedicated N-Ports for host access only. By presenting both types of groups in a single report, hosts are made aware of paths through either dedicated N-Ports or multi-purpose N-Ports to logical units (disks, logical unit numbers (LUNs), or the like) managed by the storage controller.

In accordance with the illustrative embodiments, the mechanisms utilize AAS bits in the TPG reports to indicate which ports a host should use to access associated LUNs when the host is zoned to access those LUNs through both dedicated N-Ports and multi-purpose N-Ports. That is, in the context of the Small Computer System Interface (SCSI) spec, the storage controller uses the TPG report, to respond to a Report Target Port Groups (RTPG) command received from a host or application client. The TPG report includes Target Port Group Descriptors comprising Target Port Descriptors. The Target Port Group Descriptors comprising Target Port Descriptors for dedicated host access ports will report an Active/optimized Asymmetric Access State for the port group. Conversely, Target Port Group Descriptors comprising Target Port Descriptors for multi-purpose ports will report an Active/Non-optimized Asymmetric Access State for the port group. Therefore, the storage controller designates a dedicated N-Ports group for host access only as an Active/optimized group and designates a multi-purpose N-Port group as an Active/non-optimized group. Thus, well-configured hosts that conform to Asymmetrical Logical Unit Access (ALUA) standards will utilize dedicated N-Ports for host access to the storage controller, which may be used even without requiring PC switch zoning/rezoning changes in the FC fabric, thereby leaving the multi-purpose ports available for other purposes, such as an initiator of I/O to back-end storage devices, to handle communication between nodes in the storage controller, or the like.

Inclusion of a dedicated N-Ports group in the TPG reports may depend on a configuration of the storage controller. If the storage controller does not service host I/Os through multi-purpose ports, a descriptor for the multi-purpose port group may be excluded from the TPG report. Further, if NPIV support has been disabled on the storage controller, the descriptor for the dedicated N-Ports group may be excluded from the TPG report. Alternatively, both the descriptors for the dedicated N-Ports group and the multi-purpose N-Ports group may be included in the TPG reports, but the Asymmetric Access State (AAS) of each group may be reported as unavailable.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Further, while the remainder of the description is directed to a storage area network (SAN), the illustrative embodiments are not limited to only a SAN as a SAN is only used as one example of a storage network. That is, the error data collection mechanism of the illustrative embodiment may operate within any type of storage network, for example, a storage area network (SAN), Internet Small Computer System Interface (iSCSI), converged infrastructure, or the like.

Thus, the illustrative embodiments may be utilized in many different types of data processing environments. In order to provide a context for the description of the specific elements and functionality of the illustrative embodiments, FIGS. 1A, 1B, and 2 are provided hereafter as example environments in which aspects of the illustrative embodiments may be implemented. It should be appreciated that FIGS. 1A, 1B, and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1A and 1B depict one embodiment of a data processing network 100 suitable for implementing the illustrative embodiments. Data processing network 100 includes a storage area network (SAN) 105 that, in the depicted example, is a Fibre Channel (FC) compliant SAN. Fibre Channel is a scalable technology data transfer interface technology that maps several common transport protocols, including Internet Protocol (IP) and Small Computer System Interface (SCSI), allowing it to merge high-speed I/O and networking functionality in a single connectivity technology, Fibre Channel is a set of open standards defined by American National Standards Institute (ANSI) and International Organization for Standardization (ISO). Detailed information regarding the various Fibre Channel standards is available from ANSI Accredited Standards Committee (ASC) X3T11, which is primarily responsible for the Fibre Channel project. These standards are collectively referred to in this specification as the Fibre Channel standard or the Fibre Channel specification. Fibre Channel operates over both copper and fiber optic cabling at distances of up to 10 Kilometers and supports multiple inter-operable topologies including point-to-point, arbitrated-loop, and switching (and combinations thereof).

It should be appreciated that while the illustrative embodiments will be described in terms of using Fibre Channel and a Fibre Channel fabric, the illustrative embodiments are not limited to such. Rather, any interface technology, communication suite, or communication protocol may be utilized with the mechanisms of the illustrative embodiments without departing from the spirit and scope of the present invention. Fibre Channel is only used as an example and is not intended to state or imply any limitation with regard to the types of communication connections or protocols that may be used with the mechanisms of the illustrative embodiments.

The depicted embodiment of SAN 105 includes a set of nodes 120 that are interconnected through a Fibre Channel fabric 101. The nodes 120 of data processing network 100 may include any of a variety of devices or systems including, as shown in FIG. 1A, one or more data processing systems (hosts or application clients) 102, tape subsystems 104, redundant array of independent disks (RAID) devices 106a-106n, disk subsystems 108, Fibre Channel arbitrated loops (FCAL) 110, and other suitable data storage and data processing devices (not shown). As illustrated, the one or more data processing systems 102 may access the tape subsystems 104, redundant array of independent disks (RAID) devices 106a-106n, disk subsystems 108, Fibre Channel arbitrated loops (FCAL) 110, and other suitable data storage and data processing devices (not shown) through the Fibre Channel fabric 101 via storage controller 109. One or more nodes 120 of data processing network 100 may be connected to an external network 103. External network 103 may be a local area network (LAN), a wide area network (WAN), or the like. For example, external network 103 may be an Internet Protocol (IP) supported network, such as the Internet.

With reference to FIG. 1B, Fibre Channel fabric 101 typically includes one of more interconnected Fibre Channel switches 130, each of which includes a set of Fibre Channel ports 140. Each Fibre Channel port 140 typically includes a connector, a transmitter, a receiver, and supporting logic for one end of a Fibre Channel link and may further include a controller, Fibre Channel ports 140 act as repeaters for all other ports 140 in Fibre Channel fabric 101. Fibre Channel ports 140 are described according to their topology type. An F port denotes a switch port (such as are shown in FIG. 1B), an L or NL port denotes an Arbitrated-Loop link (not shown in FIG. 1B), and an FL port denotes an Arbitrated-Loop to Switch connection port (not shown in FIG. 1B). Fibre Channel ports 140 communicate in a standardized manner that is independent of their topology type, allowing Fibre Channel fabric 101 to support inter-topology communication.

As shown in FIGS. 1A and 1B, one or more of the computing devices, e.g., data processing systems 102, tape subsystems 104, RAID devices 106a-106n, disk subsystems 108, Fibre Channel arbitrated loops (FCAL) 110, or the like, may be specifically configured to implement error data collection improvements in SAN components. The configuring of the computing devices may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as data processing systems 102, tape subsystems 104, RAID devices 106a-106n, disk subsystems 108, Fibre Channel arbitrated loops (FCAL) 110, or the like, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improving error data collection in SAN components.

As noted above, the mechanisms of the illustrative embodiments utilize specifically configured computing devices, or data processing systems, to perform the operations for improving error data collection. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as data processing systems 102, tape subsystems 104, RAID devices 106a-106n, disk subsystems 108, Fibre Channel arbitrated loops (FOAL) 110, storage controller 109, or the like, in FIG. 1A, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202, Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not, ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface, Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to improving error data collection in SAN components.

Those of ordinary skill in the art will appreciate that the hardware in FIGS. 1A, 1B, and 2 may vary depending on the implementation. Other internal hardware or peripheral devices, such as flash memory, equivalent non-volatile memory, or optical disk drives and the like, may be used in addition to or in place of the hardware depicted in FIGS. 1A, 1B, and 2. Also, the processes of the illustrative embodiments may be applied to a multiprocessor data processing system, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
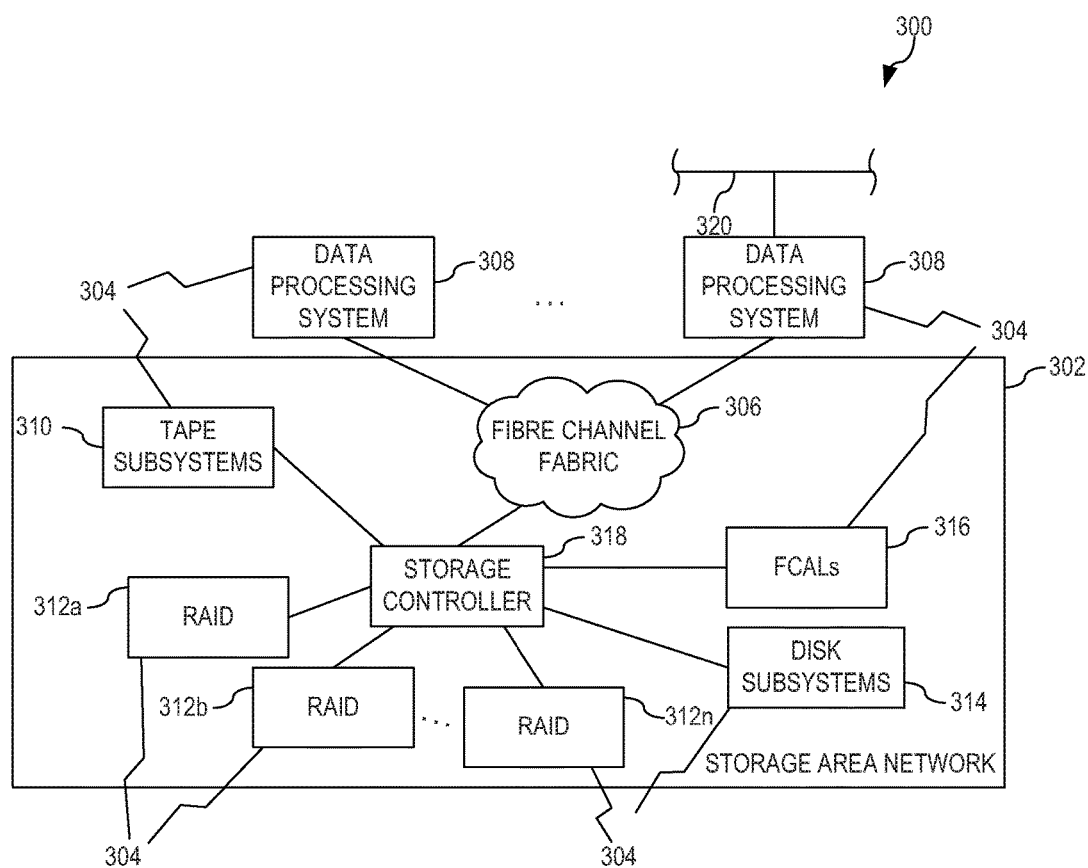
FIG. 3 depicts a data processing system in which an N-Port ID Virtualization (NPIV) enabled storage controller provides dedicated N-Ports for host access in accordance with an illustrative embodiment.

FIG. 3 depicts a data processing system in which an N-Port ID Virtualization (NPIV) enabled storage controller provides dedicated N-Ports for host access in accordance with an illustrative embodiment. Similar to FIG. 1A, data processing system 300 comprises a storage area network (SAN) 302 that, in the depicted example, is a Fibre Channel (FC) compliant SAN. The depicted embodiment of SAN 302 includes a set of nodes 304 that are interconnected through a Fibre Channel fabric 306. The set of nodes 304 of data processing system 300 comprises variety of devices or systems including one or more data processing systems (host or application client) 308, tape subsystems 310, redundant array of independent disks (RAID) devices 312A-312N, disk subsystems 314, Fibre Channel arbitrated loops (FCAL) 316, and other suitable data storage and data processing devices (not shown). The one or more data processing systems (computers) may include one or more host systems. As illustrated, the one or more data processing systems 308 may access the tape subsystems 310, RAID devices 312a-312n, disk subsystems 314, Fibre Channel arbitrated loops (FCAL) 316, and other suitable data storage and data processing devices (not shown) through the Fibre Channel fabric 306 via storage controller 318. One or more of the one or more nodes 304 of data processing system 300 may be connected to an external network 320. External network 320 may be a local area network (LAN), a wide area network (WAN), or the like. For example, external network 320 may be an Internet Protocol (IP) supported network, such as the Internet.

When NPIV is enabled on storage controller 318, storage controller 318 makes a dedicated N-Ports group available for host access only. Therefore, when the one or more data processing systems 308 connect to SAN 302, each of the one or more data processing systems 308 sends a report target port groups (RTPG) Small Computer System Interface (SCSI) request to storage controller 318. Responsive to the RTPG request, storage controller 318 modifies a target port group (TPG) report to be sent to the data processing system 308 in one or more of the following ways:

include a target port group descriptor comprising target port descriptors for the dedicated N-Ports for host access only, include a target port group descriptor containing target port descriptors for the multi-purpose N-Ports, set the Asymmetric Access State (AAS) bits for the dedicated N-Port group descriptor as Active/optimized, as this encourages hosts that comply with Asymmetric Logical Unit Access (ALUA) to use these ports even though other ports are visible, set the Asymmetric Access State (AAS) bits for multi-purpose N-Port group descriptor as Active/non-optimized. These ports are still capable of processing host input/output (I/O) commands but a host that complies with Asymmetric Logical Unit Access (ALUA) should only use them when the dedicate N-Port group ports are not available, or if the configuration of storage controller 318 is such that the multi-purpose port group should not be used for host I/O commands, then the TPG report to be sent to a host system in response to the RTPG request should either:

entirely exclude the target port group descriptors comprising target port descriptors of multi-purpose N-Ports that should not be used for host I/O commands from the TPG report, or include the target port group descriptors comprising target port descriptors of multi-purpose N-Ports that should not be used for host I/O commands in the TPG report, but report those target port group descriptors as having an Unavailable asymmetric access state.

Further, if NPIV support has been disabled on storage controller 318, storage controller 318 modifies the TPG report to be sent to the data processing system 308 such that storage controller 318 excludes the dedicated N-Port group from the TPG report. If NPIV is disabled, storage controller 318 modifies the TPG report to set the Asymmetric Access State (AAS) bits for multi-purpose N-Port group descriptor as Active/optimized.

Once storage controller 318 responds to the data processing system 308 with the TPG report, the data processing system 308 accesses one or more of tape subsystems 310, redundant array of independent disks (RAID) devices 312A-312N, disk subsystems 314, Fibre Channel arbitrated loops (FCAL) 316, or other suitable data storage and data processing devices (not shown), via storage controller 318 based on the port identifications provided in the TPG report That is, the TPG report presents identified N-Ports through which a host or application client should access the storage controller, as the storage controller will then access the various backend storage devices. Thus, when NPIV is enabled, the TPG report presents ports through which a host or application client may access virtualized disks, LUNs, or the like). In accordance with the illustrative embodiments, reporting dedicated N-Ports in a dedicated N-Port port group that has the Active/optimized AAS, encourages hosts to use the dedicated N-Ports. Thus, if the data processing system 308 is a well-configured host system that conforms to Asymmetrical Logical Unit Access (ALUA) standards, the host system honors the AAS bits of port group descriptors reported in the TPG report and accesses the storage controller 318 using the properly intended port, without any change to any zoning configurations that exist in storage controller 318.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
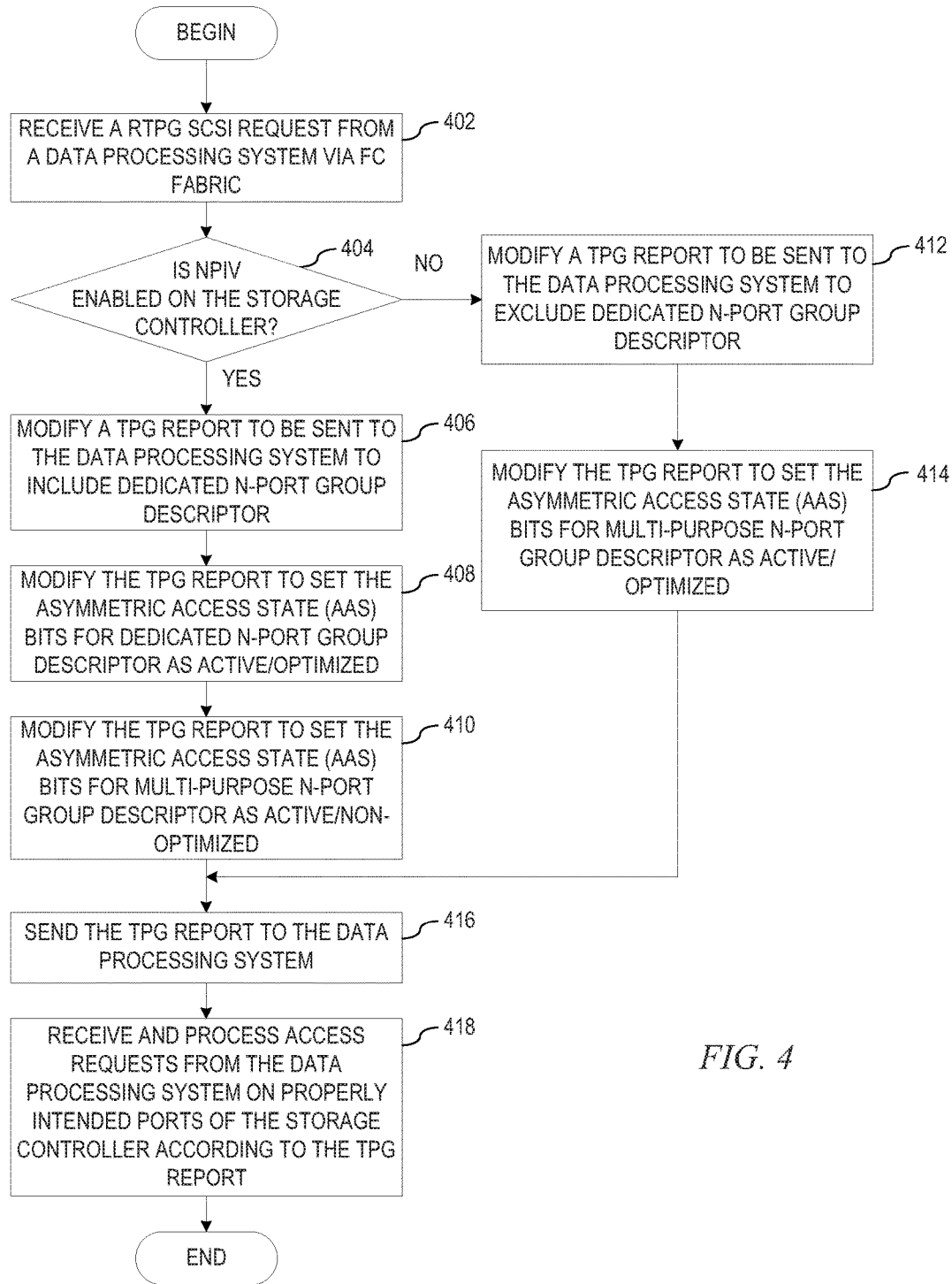
FIG. 4 depicts an exemplary flowchart of the operation performed by a storage controller in a storage area network (SAN) in executing a connection from a data processing system to the storage system in accordance with an illustrative embodiment.

FIG. 4 depicts an exemplary flowchart of the operation performed by a storage controller in a storage area network (SAN) in executing a connection from a data processing system to the storage system in accordance with an illustrative embodiment. As the operation begins, the storage controller receives a report target port groups (RTPG) Small Computer System Interface (SCSI) request from the data processing system via a Fibre Channel (FC) fabric (step 402). Responsive to receiving the RTPG request, the storage controller determines whether N-Port ID Virtualization (NPIV) is enabled on the storage controller (step 404). If at step 404 the storage controller determines that NPIV is enabled, the storage controller modifies a target port group (TPG) report to be sent to the data processing system to include dedicated N-Port group descriptor (step 406). The storage controller then modifies the TPG report to set the Asymmetric Access State (AAS) bits for dedicated N-Port group descriptor as Active/optimized (step 408). The storage controller then modifies the TPG report to set the Asymmetric Access State (AAS) bits for multi-purpose N-Port group descriptor as Active/non-optimized (step 410).

If at step 404 the storage controller determines that NPIV is disabled, the storage controller modifies the TPG report to be sent to the data processing system to exclude the dedicated N-Port group descriptor from the TPG report (step 412). The storage controller then modifies the TPG report to set the Asymmetric Access State (AAS) bits for multi-purpose N-Port group descriptor as Active/optimized (step 414). From 410 or 414, the storage controller sends the generated TPG report to the data processing system (step 416). The storage controller then receives and processes access requests from the data processing system on properly intended ports of the storage controller according to the TPG report (step 418). That is, the storage controller receives and processes access requests from the data processing system to one or more of a tape subsystems, redundant array of independent disks (RAID) devices, disk subsystems, Fibre Channel arbitrated loops (FCAL), or other suitable data storage and data processing devices based on the port identifications provided in the TPG report. Accordingly, if the data processing system is a well-configured host system that conforms to Asymmetrical Logical Unit Access (ALUA) standards, the host system honors the AAS bits of port groups reported in the TPG report and accesses the storage controller using the properly intended port, without any change to any zoning configurations that exist in the storage controller. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms prioritizing the use of dedicated N-Ports and/or multi-purpose N-Ports for host access when N-Port ID Virtualization (NPIV) is enabled in a storage controller. Utilizing Asymmetric Access State (AAS) bits in a target port group (TPG) report, well-configured hosts that conform to Asymmetrical Logical Unit Access (ALUA) standards will utilize dedicated N-Ports even when the FC fabric is zoned such that host may access the storage controller through both types of port (dedicated N-Ports and multi-purpose N-Ports). When virtual N-Ports are enabled, additional target port group descriptors are added to TPG reports to report multi-purpose N-Ports and dedicated N-Ports for host access only. By presenting the additional group for dedicated N-Ports for host access only in a single report, hosts are made aware of paths through either dedicated N-Ports or multi-purpose N-Ports to logical units (disks, logical unit numbers (LUNs), or the like) managed by the storage controller.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit, of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a storage controller, for executing a connection from a data processing system to the storage controller using ports specified in a target port group (TPG) report, the method comprising:
   receiving, by the storage controller, a report target port groups (RTPG) Small Computer System Interface (SCSI) request from the data processing system via a Fibre Channel (FC) fabric;
   determining, by the storage controller, whether N-Port ID Virtualization (NPIV) is enabled on the storage controller;
   responsive to NPIV being enabled, modifying, by the storage controller, the TPG report to be sent to the data processing system to include one or more dedicated N-Ports and one or more multi-purpose N-Ports, wherein modifying the TPG report for the one or more dedicated N-Ports includes setting Asymmetric Access State (AAS) bits of a dedicated N-Port descriptor associated with the dedicated N-Ports as Active/optimized;
   sending, by the storage controller, the modified TPG report to the data processing system; and
   processing, by the storage controller, an access request received from the data processing system to one or more data processing devices controlled by the storage controller, wherein the access request is received on one of the one or more dedicated N-Ports and the one or more multi-purpose N-Ports according to the TPG report and a device type of the data processing system.

2. The method of claim 1, wherein, responsive to the device type of the data processing system being a host system, the host system accesses the storage controller via either the one of the one or more dedicated N-Ports or the one or more multi-purpose N-Ports.

3. The method of claim 1, wherein the host system that accesses the storage controller via the one or more dedicated ports is a host system that conforms to Asymmetrical Logical Unit Access (ALUA) standards.

4. The method of claim 1, wherein the storage controller modifies the TPG report to report a dedicated N-Port group comprising the one or more dedicated N-Ports for host access only.

5. The method of claim 1, wherein the storage controller modifies the TPG report to set Asymmetric Access State (AAS) bits for the one or more multi-purpose N-Ports in a multi-purpose N-Port group, although still capable of processing host input/output (I/O) commands, as Active/non-optimized.

6. The method of claim 1, wherein the storage controller modifies the TPG report to, responsive to a configuration of the storage controller being that a multi-purpose port group should not be used for host I/O commands, either exclude the multi-purpose N-Ports in the multi-purpose port group that should not be used for host I/O commands or include the multi-purpose N-Ports the multi-purpose ports group that should not be used for host I/O commands and report all associated paths in the multi-purpose ports group as unavailable.

7. The method of claim 1, further comprising:
   responsive to NPIV being disabled, modifying, by the storage controller, the TPG report to be sent to the data processing system to exclude the one or more dedicated N-Ports and include the one or more multi-purpose N-Ports; and modifying, by the storage controller, the TPG report to set the Asymmetric Access State (AAS) bits for multi-purpose N-Port group descriptor as Active/optimized.

8. A computer program product comprising a computer readable storage medium having a computer readable program stored therein, wherein the computer readable program, when executed on a computing device, causes the computing device to:

receive a report target port groups (RTPG) Small Computer System Interface (SCSI) request from a data processing system via a Fibre Channel (FC) fabric;

determine whether N-Port ID Virtualization (NPIV) is enabled;

responsive to NPIV being enabled, modify a TPG report to be sent to the data processing system to include one or more dedicated N-Ports and one or more multi-purpose N-Ports, wherein modifying the TPG report for the one or more dedicated N-Ports includes setting Asymmetric Access State (AAS) bits of a dedicated N-Port descriptor associated with the dedicated N-Ports as Active/optimized;

send the modified TPG report to the data processing system; and process an access request received from the data processing system to one or more data processing devices controlled by the computing device, wherein the access request is received on one of the one or more dedicated N-Ports and the one or more multi-purpose N-Ports according to the TPG report and a device type of the data processing system.

9. The computer program product of claim 8, wherein, responsive to the device type of the data processing system being a host system, the host system accesses the computing device via either the one of the one or more dedicated N-Ports or the one or more multi-purpose N-Ports.

10. The computer program product of claim 8, wherein the host system that accesses the computing device via the one or more dedicated ports is a host system that conforms to Asymmetrical Logical Unit Access (ALUA) standards.

11. The computer program product of claim 8, wherein the computer readable program causes the computing device to modify the TPG report to report a dedicated N-Port group comprising the one or more dedicated N-Ports for host access only.

12. The computer program product of claim 8, wherein the computer readable program causes the computing device to modify the TPG report to set Asymmetric Access State (AAS) bits for the one or more multi-purpose N-Ports in a multi-purpose N-Port group, although still capable of processing host input/output (I/O) commands, as Active/non-optimized.

13. The computer program product of claim 8, wherein the computer readable program causes the computing device to modify the TPG report to, responsive to a configuration of the computing device being that a multi-purpose port group should not be used for host I/O commands, either exclude the multi-purpose N-Ports in the multi-purpose port group that should not be used for host I/O commands or include the multi-purpose N-Ports the multi-purpose ports group that should not be used for host I/O commands and report all associated paths in the multi-purpose ports group as unavailable.

14. The computer program product of claim 8, wherein the computer readable program further causes the computing device to:

responsive to NPIV being disabled, modify the TPG report to be sent to the data processing system to exclude the one or more dedicated N-Ports and include the one or more multi-purpose N-Ports; and modify the TPG report to set the Asymmetric Access State (AAS) bits for multi-purpose N-Port group descriptor as Active/optimized.

15. An apparatus comprising:

a processor; and a memory coupled to the processor, wherein the memory comprises instructions which, when executed by the processor, cause the processor to:

receive a report target port groups (RTPG) Small Computer System Interface (SCSI) request from a data processing system via a Fibre Channel (PC) fabric;

determine whether N-Port ID Virtualization (NPIV) is enabled;

responsive to NPIV being enabled, modify a TPG report to be sent to the data processing system to include one or more dedicated N-Ports and one or more multi-purpose N-Ports, wherein modifying the TPG report for the one or more dedicated N-Ports includes setting Asymmetric Access State (AAS) bits of a dedicated N-Port descriptor associated with the dedicated N-Ports as Active/optimized;

send the modified TPG report to the data processing system; and process an access request received from the data processing system to one or more data processing devices controlled by the apparatus, wherein the access request is received on one of the one or more dedicated N-Ports and the one or more multi-purpose N-Ports according to the TPG report and a device type of the data processing system.

16. The apparatus of claim 15, wherein, responsive to the device type of the data processing system being a host system, the host system accesses the apparatus via either the one of the one or more dedicated. N-Ports or the one or more multi-purpose N-Ports.

17. The apparatus of claim 15, wherein the host system that accesses the apparatus via the one or more dedicated ports is a host system that conforms to Asymmetrical Logical Unit Access (ALUA) standards.

18. The apparatus of claim 15, wherein the instructions cause the apparatus to modify the TPG report to report a dedicated N-Port group comprising the one or more dedicated N-Ports for host access only.

19. The apparatus of claim 15, wherein the instructions cause the apparatus to modify the TPG report to set Asymmetric Access State (AAS) bits for the one or more multi-purpose N-Ports in a multi-purpose N-Port group, although still capable of processing host input/output (I/O) commands, as Active/non-optimized.

20. The apparatus of claim 15, wherein the instructions cause the apparatus to modify the TPG report to, responsive to a configuration of the apparatus being that a multi-purpose port group should not be used for host I/O commands, either exclude the multi-purpose N-Ports in the multi-purpose port group that should not be used for host I/O commands or include the multi-purpose N-Ports the multi-purpose ports group that should not be used for host I/O commands and report all associated paths in the multi-purpose ports group as unavailable.

\* \* \* \* \*